Nov. 9, 1965

J. R. COX, JR 3,217,321

COLLISION AVOIDANCE SYSTEM

Filed Jan. 31, 1962

*INVENTOR.*
JEROME R. COX, Jr.

BY

*Jerome R. Cox*

ATTORNEY

Nov. 9, 1965  J. R. COX, JR  3,217,321
COLLISION AVOIDANCE SYSTEM
Filed Jan. 31, 1962  5 Sheets-Sheet 3

INVENTOR.
JEROME R. COX, jr
BY
Jerome R. Cox
ATTORNEY

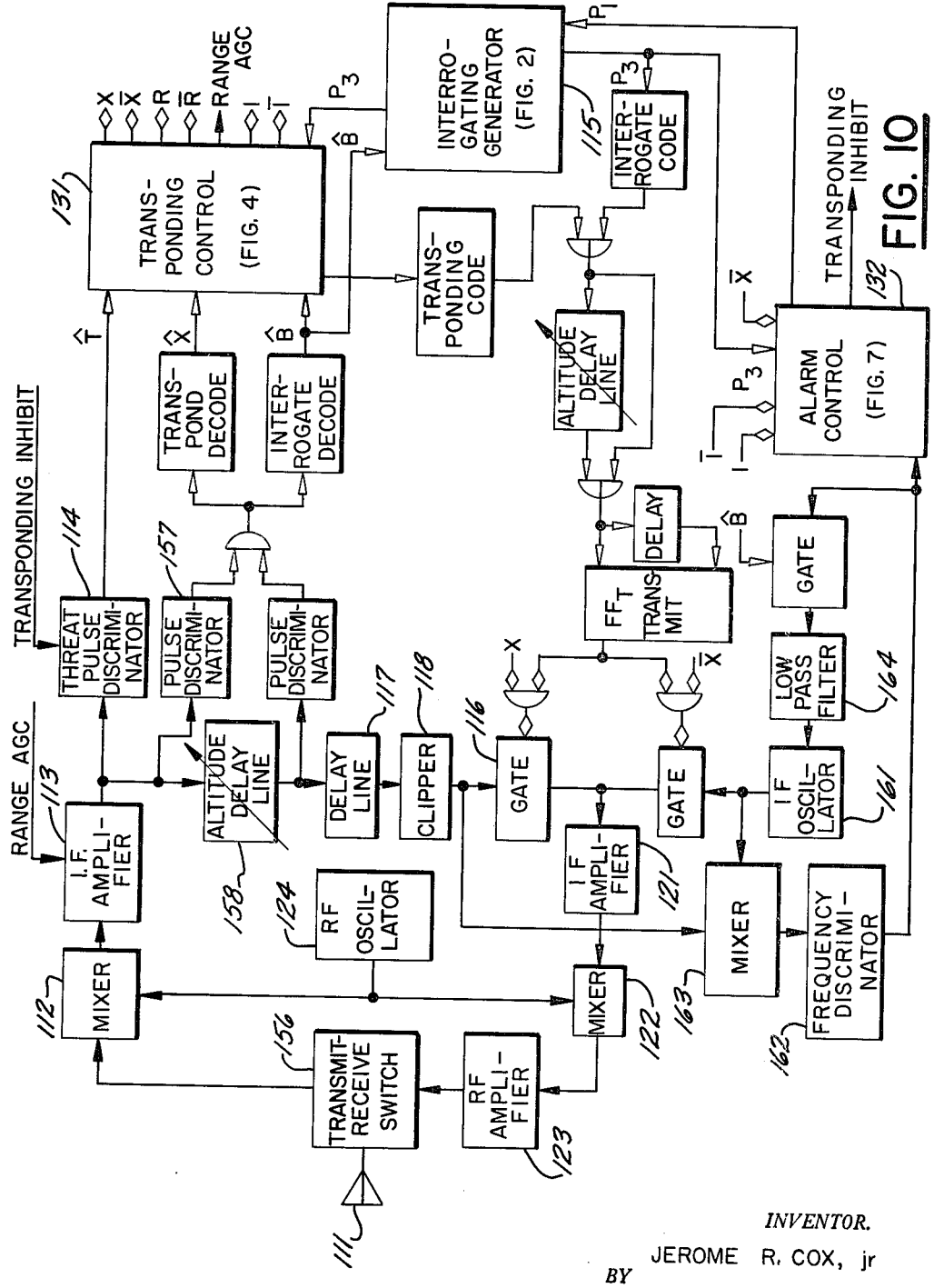

3,217,321
COLLISION AVOIDANCE SYSTEM
Jerome R. Cox, Jr., Kirkwood, Mo.
(415 Wicksworth Lane, Sunset Hills, Mo.)
Filed Jan. 31, 1962, Ser. No. 170,168
7 Claims. (Cl. 343—7.5)

The inventions disclosed and claimed in this application relate to instruments for use on moving craft such as naval craft, aircraft, etc., and specifically to instruments for aircraft and to methods for the preventing or minimizing of midair aircraft collisions.

PROBLEMS INVOLVED

One of the most serious problems facing the world of aviation today is the ever increasing number of aircraft collisions, not only in regions of high traffic density, but also in areas remote from large traffic control centers. At this time no one questions the need for a universal anti-collision device.

The importance of equipping all aircraft with a universal anticollision device is becoming more evident almost daily. A major obstacle to the attainment of such a goal, however, is the fact that the largest number of aircraft in use today are privately owned. The cost of a useful proximity warning indicator (PWI) would probably be prohibitive to most owners, and the cost of a highly complex collision avoidance system (CAS) would certainly be prohibitive to them. Conversely, a relatively simple device such as a simple radio beacon in each craft would not give the operator any indication of impending danger. It would probably protect him, it is true, from collision with the owner of a highly complex system, but would not protect him from collision with other aircraft equipped only like himself with a beacon device. Hereinafter in this application, Collision Avoidance Systems (CAS) and Proximity Warning Indicators (PWI) may be designated by the initial abbreviations.

Even if every craft could be equipped with a PWI or CAS, such a device would be of reduced or questionable value in regions of high traffic density (such as adjacent to airports), simply because flight organization in such a situation requires the leadership of a ground based control center. Thus the PWI would either have to be totally disregarded in such situations or possibly made totally inoperative at such times. The CAS would be useful in such situations only in the event of failure of ground control. Thus the chief use of a practical airborne CAS or PWI is in regions where aircraft density is moderate or low. The anticollision device should nevertheless be capable, as mine is, of being integrated with the operation of such ground control centers. A further general requirement of a satisfactory CAS or PWI is that it be usable in any part of the world regardless of terrain. Any system which gains worldwide acceptance must, of necessity, be simple, economical and highly reliable.

A satisfactory CAS must provide continuous surveillance under all flight conditions. It must be automatic, requiring no attention from the pilot under normal flight conditions; but whenever there is a serious threat of a collision, must either automatically execute a collision avoidance maneuver, or instruct the pilot definitely to execute such a collision avoidance maneuver, and what type of collision avoidance maneuver to execute. If the collision avoidance system (CAS) depends upon the notification of the pilot to execute such a maneuver, the warning must be automatic, requiring no attention from the pilot under normal flight, but must attract his attention as soon as danger impends. The occurrence of false alarms must be held to a minimum.

A universally acceptable CAS must be built so that it can be operated independently from other equipment in the airplane. Other desirable features of a CAS are: reliability, simplicity, ease of maintenance, and a self-checking capability.

The speed of the jet age has made obsolete the see-and-be-seen principle which has been the heart of air traffic control since it was established by the Civil Aeronautics Act of 1938. Air safety experts say that human reactions have fallen behind the speed of the jet age. When two planes are approaching each other at 600 miles per hour, or more, even if one pilot sees the other aircraft a mile away, he may collide with it before he can cause the plane to react in an effort to avoid the collision.

Unless all aircraft in the air are required by regulations to be equipped, there is a high likelihood that most aircraft will not be equipped. Even if only a few aircraft are not equipped, there will be significant probability of collisions and resulting disaster. Useful radar systems (PWI) utilizing conventional radar equipment apparently could be devised, but such systems would probably be cumbersome, heavy, and expensive both to install and maintain; and most importantly, they would depend entirely upon pilot recognition, evaluation, and decision. It would probably be considered unreasonable to require them on all aircraft. It is therefore highly desirable that there be devised a simple, relatively inexpensive, lightweight system for avoiding collisions of aircraft when there are two or more aircraft in the same vicinity.

At the present, there are apparently three main fields of endeavor in the field of airborne collision prevention programs. These three are: Collision Avoidance Systems (CAS), Pilot Warning Instruments or Proximity Warning Indicators (PWI), and Conspicuity Enhancement (CE).

A CAS will detect aircraft, evaluate the collision threat, and determine the escape maneuver to be executed by the human pilot or by the auto pilot, and either execute the escape maneuver automatically or demand that the human pilot execute such escape maneuver, advising him of what the escape maneuver must be. A PWI will alert the pilot to aircraft which constitute a threat, probably limiting the alerting to aircraft which are in the same altitude segment and probably providing bearing and/or range information to materially increase the visual acquisition range. CE includes high visibility paints, lights, and other devices to make aircraft easier to discern. For PWI, the electronic devices are visualized as being simpler than CAS, but the overall problem is increased in difficulty by the requirement that (in the case of PWI systems) the pilot must locate other aircraft and compute the threat urgencies.

While the embodiments of my invention disclosed in this application are shown as designed specifically for a CAS system, and while the embodiments disclosed in my Patent No. 3,159,832 which was issued on December 1, 1964 on an application Serial No. 761,984 filed on September 19, 1958 and therefore copending herewith, are designed specifically for a PWI system, it will be obvious from a consideration of these embodiments that some of the principles, combinations, and elements of the embodiments disclosed in my aforesaid Patent No. 3,159,832 are also applicable to CAS systems, and some of the principles, combinations, and elements disclosed in this application are applicable also to PWI systems. The embodiments disclosed both in this application and in my copending previous application Serial No. 761,984 which resulted in my aforesaid Patent No. 3,159,832 are based upon pulse return radio (PRRS) systems and are, of course, all designed specifically for the prevention of midair aircraft collisions.

The Federal Aviation Agency has stated that it is its policy that positive ground based air traffic control is the optimum method of preventing air collisions while maintaining expedition. However, economic and technical consideration seem to limit the possibility of full accomplishment of this objective for all spaces at all times. An air-to-air collision avoidance system which does not require the cooperation of devices installed on the ground is desirable for areas where there is no near positive ground based air traffic control. It is assumed that a satisfactory CAS (requiring no cooperation with a ground environment) can be developed to reduce the probability of midair collisions of aircraft flying linear flight paths. While the probability of linear flight paths of sufficient duration near airports is low, there are long enroute flights where there are long linear flight paths. Thus, collision avoidance systems may be classified in two classes: the first, positive ground based air traffic control most useful near airports; and the second, airborne systems most useful in flights where there are long and frequent linear flight paths in the enroute area.

The inventions disclosed in this application apply therefore mainly to airborne systems (as distinguished from ground based control) for preventing midair collisions in the areas where the aircraft are flying linear flight paths (i.e., those areas not adjacent to airports). Moreover, airborne systems for preventing midair collisions are grouped in the two general categories defined above; i.e., PWI and CAS. Both are now needed. The airline requirements for a collision avoidance system (CAS) state that the only display desired will be that advising the pilot the necessity for, the direction of, and the duration of the correct avoiding maneuver. No time consuming display of position of other aircraft is thus desired. The CAS is expected to detect all aircraft that are sufficiently close to pose potential collision threats, smooth the data obtained, discriminate between aircraft that are threats and those that are not, and advise the pilot the necessity for a collision avoidance maneuver and the correct avoidance maneuver to execute, to obtain the desired safe separation. The prospects for an operationally acceptable self-sufficient (as distinguished from a cooperative) CAS are practically nil.

PRIOR ART

During World War II, and since, radar beacons have been used extensively in aircraft navigation and otherwise. As is well known, a true radar set operates by sending out powerful pulses of radio waves and then receiving the portions of energy that are reflected to it from objects in the path of the waves sent out and usually showing these reflected pulses on a display. The elapsed time between the emission of a pulse and the return of an echo is a measure of the distance of the reflecting target. The radar beacon is a device that upon the reception of the original radar pulses, triggers its own transmitter to give a strong reply independent of other possible radar echos in the vicinity. It may be said to be an amplifier of the echo. It is inoperative without external stimulation from the radar. When a radar transmits a signal that is received by a beacon, the radar is said to be interrogating the beacon. The radar is therefore called the interrogator. Radar beacons have been called variously beacons, transponders, responder beacons, and racons. The greatest use of radar beacons during the war was for IFF (Identification Friend or Foe). They were also used extensively in locating targets for bombing missions. Aircraft equipped with interrogators may determine their position from one or more ground stations with beacons at known positions. Air-to-surface beacon systems (interrogator on aircraft, beacon on surface) are used mainly for navigation. The principal use of surface to air systems is to aid in the surveillance, identification, and control of large numbers of aircraft from a fixed station on the surface of the earth or from a ship. To identify a particular aircraft, the response of a beacon on each aircraft included a coded identification. It has even been heretofore suggested that radar beacons may be provided for collision warning. However, so far as I know, prior to my copending application Serial No. 761,984 it had never heretofore been proposed that two identical devices transmit interrogations at regular rates until they come within range of each other and then these same two devices each serve simultaneously as an interrogator and a responder to determine range. In most prior installations or proposals for range determination of which I am aware, one device is an interrogator and the other is a responding beacon. In all others no means is provided for regular interrogation. Moreover, the interrogating responding sequence in the first class of prior art uses always heretofore terminates with the recognition by the interrogator of the response. In such prior uses, another interrogation may soon be initiated but it is a separate sequence and is not a continuous process. In such prior uses the process is always asymmetrical, and it is always under the control of the interrogator. It is never, in such prior use, under joint control of both stations who are, at least for a limited period, each simultaneously interrogating the other in a continuous process. Those prior uses that transpond continuously do not provide a means for reliably initiating this transponding process whenever aircraft approach each other within a certain range. Unlike all prior art processes, my process is, at first, a regular series of interrogations and then, for a limited period, a continuous process which does not end with the reception of the response and then start again with another interrogation, but includes continuous interrogations and responses by both stations.

Prior to my invention herein, it has not been proposed to utilize such an interrogating-responding system to determine the minimum possible time to collision.

OBJECTS

One of the objects of my invention, therefore, is the provision of a simple, relatively inexpensive, and relatively lightweight device for avoiding collisions of aircraft in midair.

A further object of my invention is the provision of such a device capable of either notifying the pilot of the necessity of executing a specific collision avoidance maneuver, or of actually operating the aircraft to execute such a collision avoidance maneuver.

A further object is the provision of means for automatically computing time to contact of a moving vehicle comprising one station approaching another station whether such second station is fixed or moving.

A further more specific object of my invention is the provision of means for avoiding collision of aircraft that utilizes a velocity measuring system to compute the minimum possible time to collision, and executing a collision avoidance maneuver (or notifying the pilot to execute said maneuver) when the computed time to collision is decreasing and has decreased to a specified minimum length of time.

A further specific object is the provision of means for automatically computing time to collision of two or more stations approaching each other whether such stations are aircraft, naval ships or other form of craft.

A further object of my invention is the provision of a system for avoiding collision in aircraft (CAS) which operates when aircraft are in an area of low and moderate aircraft density to avoid collisions, but yet is compatible with ground based air traffic control in areas of high aircraft density.

Further objects and features of my invention will be apparent from the following specification and claims when considered in connection with the accompanying drawings illustrating embodiments of my invention.

In the drawings:

In the drawings illustrating embodiments of my invention wherein I have shown several embodiments of my invention:

FIG. 10 is a block diagram of a complete collision avoidance system designed in accordance with my inventions, including the interrogating generator of FIG. 2, the transponding control of FIG. 4, and the alarm control of FIG. 7.

GENERAL DESCRIPTION

Figure 1:
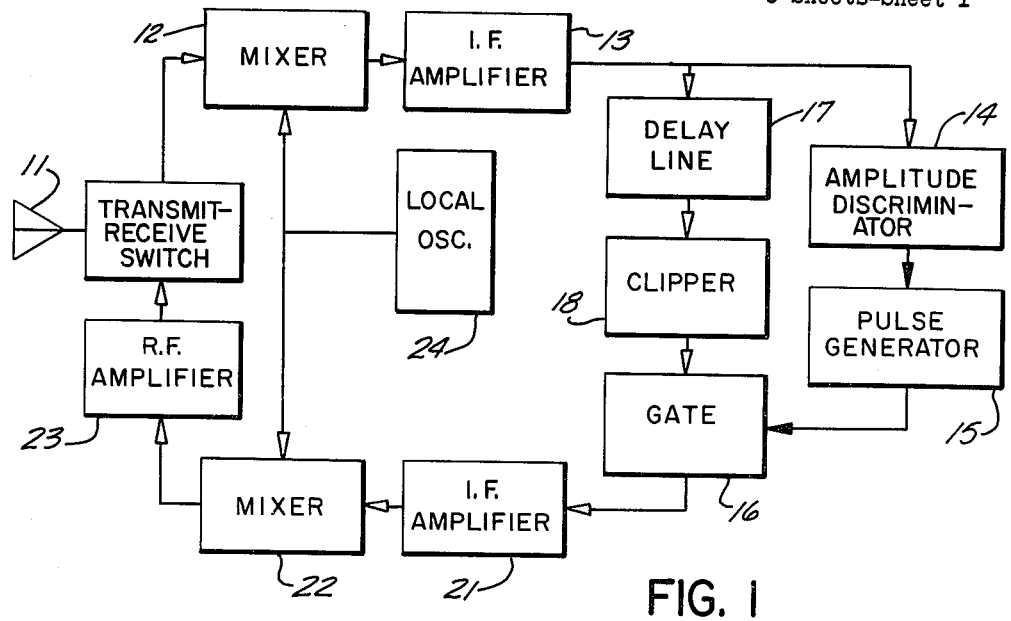
FIG. 1 illustrates a rudimentary apparatus for accomplishing the retransmission of radio pulses in order to measure the relative velocity between two moving stations (or aircraft) each equipped with such a device and thus by measuring the rate of approach between such two moving stations (or aircraft) to determine the minimum time to collision between such aircraft.

One of the main purposes of my specific invention as described herein is to prevent the collision of aircraft by the execution of (or by the instruction to the pilot to execute) a collision avoidance maneuver whenever the presence of nearby aircraft and the dangerous approach of such aircraft along a collision path endangers the aircraft by the probability of a collision. Where a plurality of aircraft in the same vicinity are each equipped with devices constructed according to my invention, they will transpond with each other and thus warn each other of their presence, distance, altitude, and/or minimum time to collision of the two aircraft. As stated above, it is highly desirable for the complete success of my system that my system shall be used universally on all aircraft in the air.

Therefore, in a relatively broad aspect, my system consists of a pulse return radio system (PRRS), wherein there are a plurality of electronic devices, wherein one of such devices shall be mounted on each aircraft, and wherein each of such devices shall include (1) a radio transmitter at times transmitting pulses with a prescribed carrier frequency; (2) a radio receiver; (3) a trigger device capable of causing the transmitter to transmit pulses substantially immediately after the recognition of a valid pulse signal whereby the transmitter will transmit pulses more frequently than it would without such excitation; and (4) a device for giving the measure of the minimum time to collision between the two stations or airplanes. Two aircraft when approaching each other will pass pulses back and forth between the electronic device (PRRS). The period of this train of pulses adjusted for the delays in recognition and retransmission by the devices of both aircraft and divided by 11 microseconds gives the approximate range in miles. The frequency shift during a period of time, such as for example $10^{-3}$ seconds would be an easily measurable number of kilocycles independent of the velocity or the range of the intruding aircraft. Such a shift will be proportional to the minimum time to collision and can be arranged to warn of the necessity of a collision avoidance maneuver (or actuate controls to make such a maneuver) whenever such minimum time to collision reaches a danger point.

At this point I wish to insert a further general non-technical discussion of the reasons for the system outlined above and of the general nature of the system.

SELF-CONTAINED SYSTEMS NOT FEASIBLE

The most desirable form of CAS would make it possible for the protected aircraft to detect a threatening aircraft even if the threatening aircraft had no special equipment. None of the known methods (radar, infra-red) for accomplishing a self-contained CAS can yield accurate information at sufficiently large ranges.

COOPERATIVE SYSTEM NECESSARY

A cooperative CAS requires that special equipment be installed in all aircraft. If only one plane is left unprotected, there is a chance for collision. Thus legislative means are required to insure that all aircraft are protected and protected with compatible systems.

The decision for a cooperative CAS is forced upon us because no self-contained system is feasible at present. However, the cooperative systems have the additional potential advantages of low power, relative simplicity, and economy.

PROBLEM OF ECONOMY

For several years it has been possible to build rather complex cooperative systems which might include digital computers that could have been installed in commercial aircraft and could probably have prevented some of the recent collisions. But only a small fraction of the aircraft operators could afford to install such equipment and the large numbers of unprotected aircraft would constitute a continuing hazard to all of the cooperating aircraft. Therefore the probability of collision would not be appreciably lessened and it is not surprising that the airline operators have not installed such CAS equipment. The problem is therefore reduced to the development of a system capable of protecting not only high performance aircraft but also low power aircraft and yet not so expensive that an undue hardship is placed on the operator of the smallest aircraft.

GROUND CONTROL CUMBERSOME

One method of solving the problem of economy would be to process all flight data through a central ground control station. All flight paths would be continuously monitored and instructions relayed to each aircraft so that no two can travel a collision course. Today's air-traffic control is a rudimentary form of this scheme. The completely automatic air-traffic control planned for the future is a more complete version. However for the plan to work, all aircraft must always fly IFR (Instrument Flight Rules). A nationwide ground control system would be required. Emergency situations cannot be handled with absolute safety and ease. For example, collision situations between maneuvering high performance aircraft would require a ground control system with an excessive channel capacity and accuracy, if false alarms are to be minimized. Finally, a CAS completely independent of air-traffic control, but cooperating therewith would enhance the reliability of the combined system. One or the other could fail without a catastrophe.

THE PROPOSED SYSTEM

The proposed system described herein seeks to solve the economic problem in part by grading the complexity of the CAS according to the performance of the aircraft. Thus, jet aircraft would be required to be cognizant of all aircraft within about 25 miles, whereas private planes with a top speed of 180 m.p.h. need only be cognizant of other such private planes within about 4 miles. This does not mean that the slow plane does not exchange information with the fast one; only that the fast one is responsible for the initiation of the exchange. All aircraft would have to have a transmitter with a 25 mile range. All planes are protected against one another because all of the gradations of the system are compatible with one another.

The most difficult portion of the design of the proposed CAS is that for the small plane. It must be simple yet capable of exchanging information with high performance aircraft. It must be inexpensive yet sufficiently accurate to extrapolate the course of a threatening aircraft within about one percent. It must exchange all necessary information yet must not overload the available radio spectrum in regions of high aircraft density. These are all conflicting requirements. If the problem of the CAS for the small plane is solved properly, the more complex gradations of the system follow with relative ease since the requirement of low cost is relaxed.

In many compatible CAS proposals all planes emit periodically a pulse of radio frequency energy. Several of these proposals suggest that the interrogating transmissions be coded to indicate the altitude of the sender. Altitude is the only information worth coding into these transmissions since it is the only unilateral information pertinent to the calculations. All other pertinent information is relative between the two aircraft.

It would be foolhardy to try to exchange all of the requisite information between all of the planes within range of each other. Even very efficient coding schemes might take many times the entire radio spectrum when as a matter of fact only a small fraction of the spectrum is likely to be assigned to the task. Therefore, in my system each threat is evaluated in several stages. The first stage is the one-way transmission provided by the interrogating signal. All aircraft at other altitudes may be ignored. A crude indication of range may be obtained from the strength of the signal and all aircraft producing signals below a certain signal strength may be ignored. Some of the more complex gradations of the system can, however, include direction-sensing equipment so that the one-way interrogating transmissions can be further screened.

The second step in the evaluation follows only if the intruder still appears to be a threat after evaluation of the one-way interrogating transmission. The aircraft first recognizing such a threat begins the exchange of information by means of a separately coded series of pulses. The two aircraft exchange information (transpond) for a short period of time, at the conclusion of which both have an estimate of the minimum time to collision. This estimate is accomplished by a simple and novel scheme (which has been suggested above) for measuring directly the ratio of the range and the closing velocity.

The final step in the evaluation of a collision threat occurs if the minimum time to collision is less than a critical time. Then the two aircraft repetitively transpond at intervals. If the minimum time to collision decreases directly with actual time over several such transmissions, there is real danger of a collision and a maneuver must be executed. The aircraft that initiated the exchange of information is automatically instructed to maneuver in one direction while the other maneuvers in the opposite direction. Thus even if one of the aircraft is incapable of maneuvering, the other may still avoid a collision.

There are believed to be at least three or four novel proposals in the proposed scheme described generally above. First, the concept of a graded, but compatible system, and second the simple method for obtaining a direct estimate of the minimum time to collision are both probably unique. Thirdly, the provision for equal spacing of signals from a large number of aircraft in a restricted space is believed unique. The PRRS is also apparently unique.

DETAILED DESCRIPTION

In FIG. 1, I have shown a diagram of one installation on a plane comprising one half of a simplified version of my velocity measuring system. This installation is here disclosed generally in order that this important feature of my invention may be thoroughly understood before passing to other features of my system. In FIG. 1, I show an antenna 11 from which signals received are passed to mixer 12 and IF amplifier 13, and thence to amplitude discriminator 14, and to pulse generator 15. Pulse generator 15 supplies pulses to gate 16. Signals from IF amplifier 13 also pass through a delay line 17 and a clipper 18 to gate 16. If the signals from 15 and 17 arrive at 16 simultaneously, these signals are then passed to IF amplifier 21, mixer 22, and RF amplifier 23, and then transmitted from antenna 11. 24 is a local RF oscillator.

Thus FIG. 1 shows a rudimentary apparatus for accomplishing the retransmission of radio pulses for the purposes described below.

The device of FIG. 1, as has been suggested above, is a part of a velocity measuring system that may be used between two moving objects or between a fixed station and a moving object. A particular application with which we are particularly concerned here is between two aircraft in connection with an aircraft collision avoidance system.

The principle of operation of this device involves the Doppler shift in frequency of a radio wave that is observed when the receiving station moves relative to the transmitting station. The amount of this frequency shift is $$\Delta f = \frac{v}{c} f_0$$

where $v$ is the relative velocity between the receiving and transmitting stations, $c$ is the speed of light, and $f_0$ is the frequency of the transmitted signal. Thus the received signal will have a frequency of $f_0 + \Delta f$. The velocity is assumed to be negative when the distance between the two stations is increasing and positive when the distance between the two stations is decreasing. For $v$ negative (stations moving apart) the received signal will have a lowered frequency. For $v$ positive (stations moving together) the received signal will have an increased frequency. We are obviously concerned mainly with $v$ positive because we are interested mainly with aircraft moving toward each other.

Usually the fractional shift in frequency $\Delta f / f_0$ is extremely small since the relative velocity of the two stations is minute compared to the speed of light. Therefore, very accurate instrumentation is required to observe the shift. This is particularly true when, as is the case for a single transmission between the two stations, two independent reference frequencies must be used.

The novelty of the particular system described herein lies in the retransmission of the received signal as received at both stations. Thus the sending and receiving stations repetitively change roles. A continuous transponding process like that described elsewhere (U.S. patent application Serial No. 761,984) takes place except that herein the received frequency is amplified, smoothed, and retransmitted as received instead of each time returning to a fixed sending frequency. Each time the pulse or array of pulses is received, it is retransmitted and undergoes an additional shift of $\Delta f$. After one complete round trip, the new frequency is given by $$f_1 = \left(f_0 + \frac{v}{c} f_0\right) + \frac{v}{c}\left(f_0 + \frac{v}{c} f_0\right) = f_0\left(1 + \frac{v}{c}\right)\left(1 + \frac{v}{c}\right) = f_0(1+\beta)^2$$

where $$\beta = \frac{v}{c}$$

After $n$ complete round trips the new frequency is $$f_n = f_0(1+\beta)^{2n} \cong f_0(1+2n\beta)$$

where the approximation results from the fact that $\beta$ is very small. Finally, the frequency shift resulting from $n$ complete round trips is $$\Delta f_n = f_n - f_0 = f_0[(1+\beta)^{2n} - 1] \cong 2n\beta f_0$$

and the original frequency shift is multiplied by the factor $2n$. If $n$ is sufficiently large, the Doppler shift becomes much more easily detectable.

Next assume that transponding according to the above scheme is carried on for a time T. The total time for a one-way trip will be approximately $r/c$ where $r$ is the range. For $n$ round trips, the total time will be $$2n\frac{r}{c}$$

Thus the total frequency shift in a time T is $\Delta f_T = 2n\beta f_0[T/(2nr/c)] = \beta f_0 Tc/r$ (and since $\beta = v/c$) $= vf_0T/r$ Then $$\frac{\Delta f_T}{f_0} = Tv/r$$

The quantity $r/v$ is a very close estimate of the minimum time to collision of the two stations or aircraft. Let us denote this time as $T_c$. Then $$\frac{\Delta fT}{f_0} = \frac{Tv}{r}\left(\frac{r/v}{Tc}\right)$$

and $$\frac{\Delta f_T}{f_0} = \frac{T}{Tc}$$

and the frequency shift is inversely proportional to $T_c$. Assuming $T = 10^{-3}$ sec., $T_c = 30$ sec., and $f_0 = 600$ mc., we get $$\Delta f_T = \frac{10^{-3}}{30} 600 \times 10^6 = 20 \text{ kc.}$$

The above are typical numbers for the aircraft collision problem involved and show that the frequency shift is easily measurable independent of the velocity or range of the intruding aircraft.

As stated above, a rudimentary apparatus for accomplishing the retransmission of the radio pulses as described above is shown in FIG. 1. A scheme using a voltage controlled local oscillator is also possible, but somewhat more complicated.

In FIG. 10, I have shown a diagram of a complete collision avoidance system constructed according to my invention. Therein elements 111–118 inclusive correspond to general elements 11–18 inclusive respectively of FIG. 1, and elements 121, 122, 123 and 124 correspond generally to elements 21, 22, 23, and 24 respectively of FIG. 1. A transponding control is shown generally at 131 and is shown in detail in FIG. 4. The interrogating pulse generator 115 is shown in detail in FIG. 2 and an alarm control is shown generally at 132 and in detail in FIG. 7.

OPERATION

The proposed Collision Avoidance System uses a band of radio waves having a width of 20 megacycles or less and having a center of frequency which may be arbitrarily set anywhere in the frequency range between 125 and 1500 megacycles. The system has two basic modes of operation: the interrogating mode and the transponding mode. In the interrogating mode, each aircraft periodically sends out pulses coded to indicate the altitude of the aircraft. One simple method for such coding is the transmission of two pulses separated by an interval proportional to the altitude. Other aircraft in the vicinity receive a number of pairs of such pulses, separate out those that represent aircraft at the same altitude, and ignore the remainder. Thus the relatively infrequent (about 1 per second) interrogating pulses provide a means whereby a crude evaluation of a collision threat may be made. In small aircraft this evaluation is based on the two aircraft being at the same altitude and within a relatively short range of each other. A rough estimation of the range can be obtained from the received signal strength. Faster aircraft will be required to have more sophisticated equipment that would, for example, determine whether a threatening aircraft remains at a constant bearing.

Assuming that the initial evaluation indicates that the aircraft transmitting a particular interrogating signal poses a collision threat, the threatened aircraft can switch to the transponding mode for a more careful evaluation. This change in mode is always initiated by one aircraft and is differentiated from interrogating pulses by a separate code. This separate code can, for example, consist of the transmission of two pairs of closely-spaced pulses wherein the separation between the two pairs of pulses indicates the altitude. Such a transponding signal is sent automatically immediately after the threatened aircraft receives an interrogating signal that represents a potential threat. Therefore the threatening aircraft will receive the transponding pulse within a few hundred microseconds after the transmission of its interrogating signal. Other aircraft will ignore the request to transpond because their interrogating signals have been sent at other times.

The threatening aircraft recognizes the request to transpond and in turn sends out its own transponding signal. The two aircraft participate in a continuous transponding process for a fixed interval of time. At the end of this time the threat is evaluated more carefully by both aircraft. If the situation continues to look dangerous, the transponding will be resumed after the transmission of the next interrogating pulse of one or the other aircraft. If the situation appears to be safe, transponding with that particular aircraft will be inhibited for a definite time.

If, after several consecutive intervals of transponding, the threat continues to be severe and meets certain specific requirements, the pilot will be warned of the collision danger. The pilot of each of the aircraft on probable collision courses will be advised to execute a vertical maneuver. For example, the aircraft that initiated the transponding will climb 500 feet, whereas the aircraft that did not initiate the transponding will descend 500 feet. The rationale for such a maneuver is general and not specific to this particular Collision Avoidance System. In any case, such a rationale is beyond the scope of this discussion. Other appropriate collision avoiding maneuvers could, of course, be used instead. The details of the operation of the system outlined above are our major concern and are contained in the sections that follow.

THE INTERROGATING PULSE GENERATOR

The primary purpose of the interrogating pulse generator is to generate pulses at a rate of approximately one per second. The pulses generated are coded into an interrogating signal to indicate the altitude of the aircraft and the fact that it is an interrogating transmission. The exact time at which a pulse is transmitted is determined, as explained hereinafter, in such a way that it does not interfere with the interrogating signals from other neighboring aircraft.

Even with the relatively high aircraft densities that may be achieved in the future, it seems unlikely that more than thirty aircraft might be at the same altitude and within a circle whose radius is 20 miles. This represents an aircraft density of 1 plane every 40 square miles or an on-center spacing of aircraft of about 6½ miles. It is probable that this density would be exceeded locally under certain circumstances. However, it is unlikely that the average density over the 1200 square-mile area included within the 20-mile radius is likely to exceed the maximum value assumed.

Equal spacing of the interrogating signals from the 30 aircraft within the 1-second period yields an interval between each of the interrogating signals of roughly 30 milli-seconds. This figure is certainly adequate to avoid the overlapping of interrogating signals and the succeeding transponding intervals.

The second function of the interrogating pulse generator is, therefore, to achieve equal spacing of the interrogating signals. This is achieved by adjusting the local interrogating transmission so that it falls half way between two adjacent interrogating signals from other aircraft. Since all aircraft participate in this process, very nearly equal spacing of all the interrogating signals can be achieved. Absolutely perfect spacing is not possible because two planes within range of each other will have some aircraft within range in common and some other aircraft within range not in common.

Figure 2:
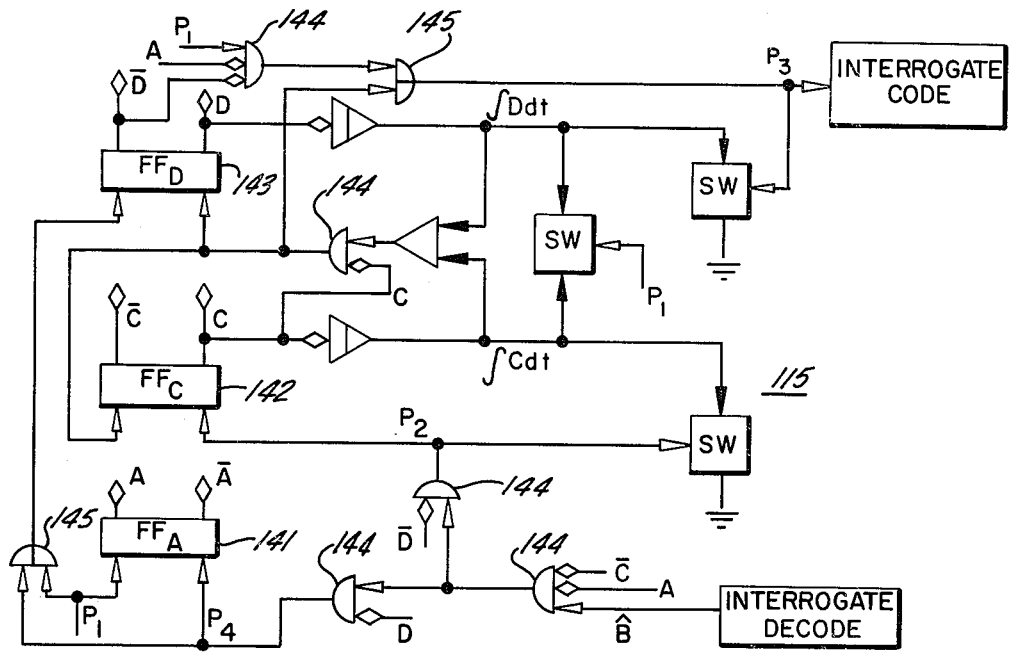
FIG. 2 is a diagram of an electronic apparatus for operating as an interrogating pulse generator in a system for collision avoidance of aircraft.
Figure 3:
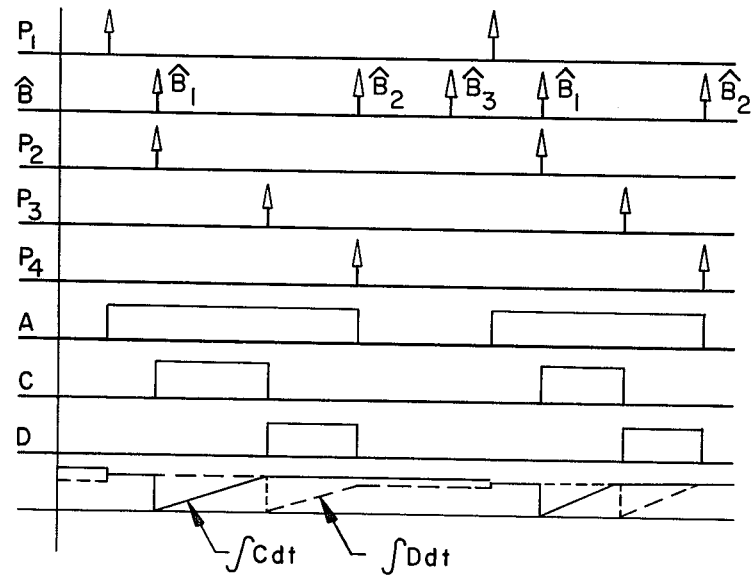
FIG. 3 is a diagram showing the waveforms of a typical operation of the generator shown in FIG. 2.

A possible realization of the interrogating pulse generator is shown in FIG. 2, and the wave forms for typical operation thereof are shown in FIG. 3. In this diagram the three rectangular boxes 141, 142 and 143 labeled respectively $FF_A$, $FF_C$ and $FF_D$ are flip-flops (bistable multivibrators). The semicircular symbols are the AND or OR circuits of conventional logical diagrams. Symbols 144 are AND circuits and symbols 145 are OR circuits. The triangular symbols are amplifier stages. The triangular symbol with the vertical line represents an integrating amplifier, and the triangular symbol without the vertical line represents a conventional difference amplifier. The open-headed arrows represent logical pulses. The open-headed diamonds represent logical levels. The solid-headed arrows represent analog signals. When a logical pulse symbol is used on the output of a difference amplifier, it indicates that a pulse is generated when the two input voltages are equal and their difference is changing in a positive direction.

Switches shown in this diagram are simply transistors along with the necessary biasing and loading circuitry that may be necessary. The logical input to the switch may be either a pulse or a level. When the input signal is on, the switch is a short circuit corresponding to the saturated state of the transistor. When the input signal is off, the switch is an open circuit corresponding to the OFF state of the transistor.

The interrogating pulse generator circuit is arranged in such a way that the local interrogating pulse $P_3$ (FIG. 3) is generated at a time that is half way between the first two interrogating pulses that arrive after the local clock pulse $P_1$. This is accomplished by storing a voltage proportional to the time between the first interrogating pulse $B_1$ and $P_3$, and a second voltage proportional to the time between the pulse $P_3$ and the second interrogating pulse $B_2$. At the time of the clock pulse these two voltages are averaged yielding a voltage proportional to the time that the pulse $P_3$ should be delayed after $B_1$. When the integrated output of flip-flop C (142) indicates that this time has elapsed, the local interrogating pulse $P_3$ is triggered. Logical circuits are included that insure that the pulse $P_3$ is transmitted even when either one or no interrogating signals are received from other aircraft.

There are, no doubt, other ways that the interrogating pulse generator function could be realized. The one proposed in FIGS. 2 and 3 does not, however, seem unduly complicated and is clearly state of the art design with relatively inexpensive components.

THE TRANSPONDING CONTROL

The purpose of the transponding control is to determine whether the system should be in the interrogating or transponding mode. The basic element, the transpond flip-flop 151 (FIG. 4), is turned on whenever a possible threat exists as determined by the examination of an interrogating signal from another aircraft. The transpond flip-flop 151 is also turned on whenever a transponding pulse is received within a few hundred microseconds after the transmission of an interrogating signal. Such a transponding pulse would indicate that some other aircraft within range has determined that there may be a dangerous situation involving the present aircraft. Therefore, transponding is to be carried out to further evaluate the situation.

The transpond flip-flop 151 is turned off automatically after a delay of approximately 1 millisecond. During the 1-millisecond interval, continuous transponding takes place with the transponding signal making a number of round trips between the two aircraft. The exact number of round trips will depend upon the range of the two aircraft.

Figure 4:
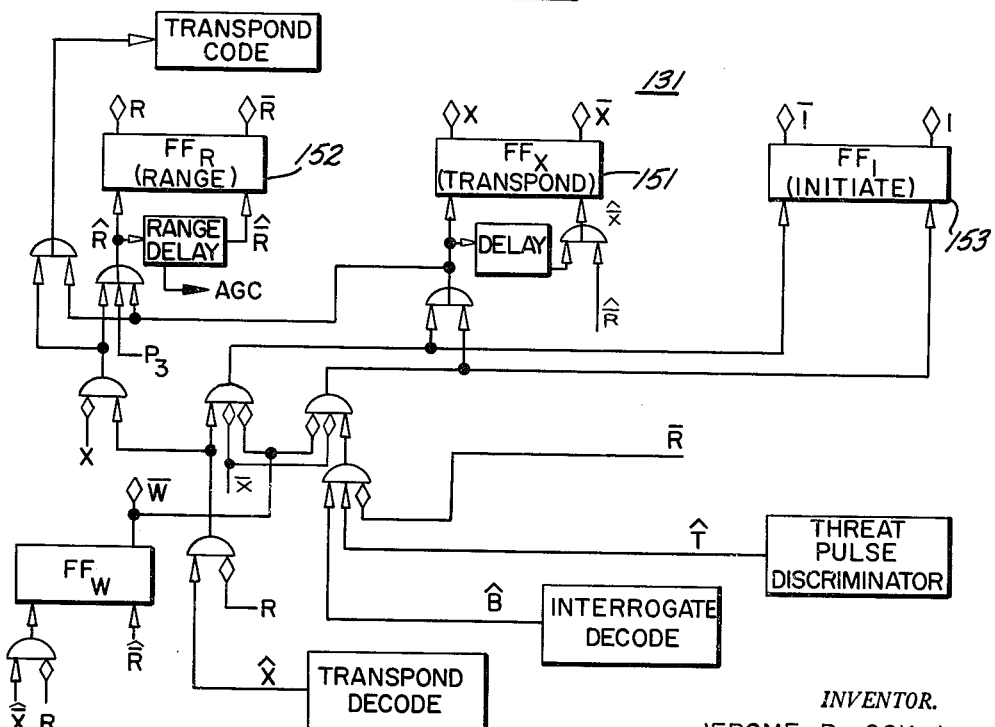
FIG. 4 is a diagram of an electronic apparatus for the control of transponding in a collision avoidance system designed according to the principles herein disclosed.
Figure 6:
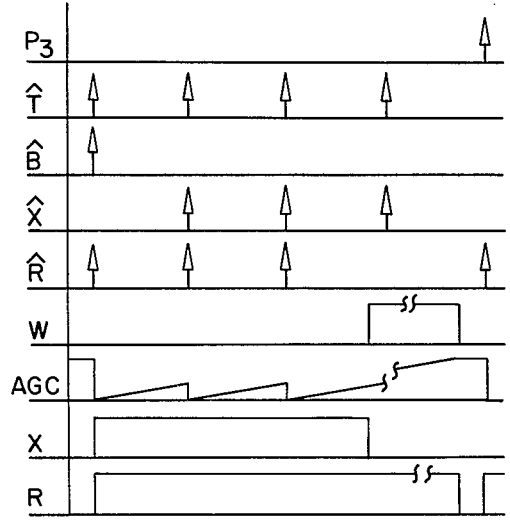
FIG. 6 is a diagram showing the waveforms of typical operation of the transponding control shown in FIG. 4.
Figure 5:
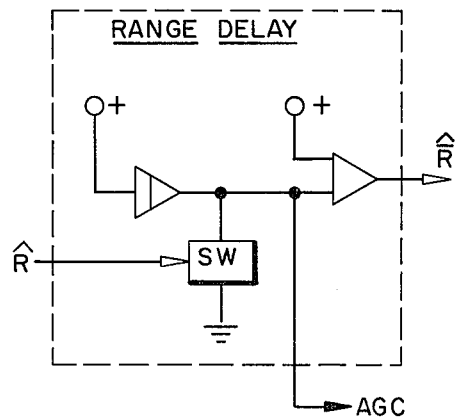
FIG. 5 is a diagram of a range delay used in the transponding control of FIG. 4.

FIGURE 4 shows that an interrogating signal of sufficient intensity to trigger the threat pulse discriminator will also turn on the transpond flip-flop 151 and the range flip-flop 152. The range flip-flop 152 is arranged to stay on for a fixed interval after the last pulse input. This fixed interval corresponds to the maximum range at which the system is to detect other aircraft. Thus, if transponding is initiated but no reply is received within a time that corresponds to the maximum range, the range flip-flop 152 and the transpond flip-flop 151 are automatically turned off. So long as transponding pulses continue to be received, the delay on the range flip-flop 152 is restarted and the transponding process is continued until the transpond flip-flop 151 turns off.

The flip-flop $FF_W$ prevents retriggering of the transpond flip-flop by the last returning transpond pulse which may follow the expiration of the transpond delay. $FF_W$ is turned off when the range delay expires.

The transponding control also contains an "initiate" flip-flop 153 that retains the information as to which of the two aircraft began the transponding. Note also that the delay on the range flip-flop 152 has an output voltage that is proportional to the range. This voltage is used to control the gain of the receiver in such a way that during transponding, pulses arrive at the pulse discriminators at more or less constant amplitude independent of range.

THE MEASUREMENT OF MINIMUM TIME TO COLLISION

The minimum time to collision $T_c$ is here defined as the ratio of the range divided by the closing velocity. If the two aircraft are on a collision course, they can meet no sooner than the time $T_c$. If the $T_c$ is large, one can conclude that the aircraft are either far apart, closing slowly, or not on collision courses. In any case, there is no immediate danger and the threat can be disregarded presently for evaluation later. If, on the other hand, the $T_c$ is small (say 40 seconds), a more serious situation exists. The threat may or may not be serious. It certainly requires continued evaluation, however. If at 1-second intervals, the value of $T_c$ is measured, one may find that $T_c$ decreases directly with real time. If this is the case, the aircraft are on collision courses and a maneuver is indicated. The time $T_c$ cannot decrease faster than real time but it may decrease slower than real time or may, in fact, increase. For either of these situations, the two aircraft are not on collision courses and the threat may be temporarily, at least, dismissed.

Thus it can be seen that the measurement of $T_c$, by determining the ratio of the range and the closing velocity, is of considerable importance in the collision problem. This ratio can be measured in the proposed system in the manner outlined above. The Doppler shift in frequency that occurs when there is relative motion between the transmitting and receiving stations is enhanced by the continuous transponding process. This enhancement is achieved by transmitting exactly the same frequency that has been received. Each time the transponding signal is retransmitted, an increment in frequency $\Delta f$ is applied to the signal. The number of such retransmissions is inversely proportional to the range and it is therefore true as shown above that $\Delta f / f_0 = T / T_c$. Here $\Delta f$ is the frequency shift, $f_0$ is the original carrier frequency, T is the duration of the continuous transponding process, and $T_c$ is, as before, the minimum time to collision. As pointed out above for a transponding time of 1 millisecond, a $T_c$ of 30 seconds and an original carrier frequency of 600 megacycles, one finds that the frequency shift is 20 kilocycles, an amount that is not too difficult to measure.

THE PROPOSED SCHEME FOR EVALUATING $T_c$

In FIGURE 10 we see the complete schematic diagram of the Collision Avoidance System. An omnidirectional UHF antenna 111 is connected to a transmit-receive switch 156. The incoming signals are heterodyned down to a convenient IF frequency, say 20 megacycles. The bandwidth of the IF amplifier 113 has to be broad enough to prevent degeneration of the rise time of the pulses required for accurate detection of altitude information and reliable decoding of the transponding and interrogating signals. At the output of the IF amplifier 113, sufficient intense signals cause the threat pulse discriminator 114 to emit a pulse. Signals less intense but above a threshold that corresponds to the maximum range operate another pulse discriminator 157. A variable delay line 158 controlled by an altimeter makes possible the detection of pulses sent from other planes at like altitudes. An additional short delay 117 to account for logical delays in the other circuitry follows. The signal having a carrier frequency of approximately 20 megacycles is then clipped at 118 so that only zero-crossing information is preserved. If transponding is taking place, the gate 116 is opened at the proper instant to pass the amplified and clipped signal. The resulting bursts of square waves are shaped in a second IF amplifier 121 and heterodyned up to the original RF frequency. It is only necessary that the local RF oscillator 124 remain stable during the time that the transponding signal is passing through the delay lines. Under these circumstances, the output frequency will be exactly the same as the input frequency. A portion of the noise will have been removed from the received signal by the filtering of the IF amplifier and the subsequent clipping.

A local IF oscillator 161, adjusted to approximately 20 megacycles, is mixed with the amplified and clipped transponding signal. So long as the two aircraft are closing, the frequency of the transponding signal will always be higher than that of the local oscillator 161 and the output of the frequency discriminator 162 connected to the output of the mixer 162 will be directly proportional to the frequency shift. This voltage proportional to $T_c$ is then used in the alarm control unit 132 for further evaluation of the threat.

Also shown in FIG. 10 are circuits that provide automatic frequency control of the local IF oscillator 161. By examining the IF frequency of the incoming interrogating signals and comparing them with the local IF oscillator 161, it is possible to detect the difference in frequency between the sum of the local oscillators 161 and 124 and the frequency transmitted by other planes. Since on the average the closing velocity of other planes in the sky will be zero, we can expect that the average frequency for all interrogating signals will be a stable quantity. Therefore, the output of the frequency discriminator 162 is also fed into a low-pass filter 164 which computes a long time average of the voltage proportional to the difference in the frequency of the local IF oscillator 161 and the proper setting for this oscillator. This voltage is therefore applied to the local IF oscillator 161 to correct its setting.

ALARM CONTROL

Figure 9:
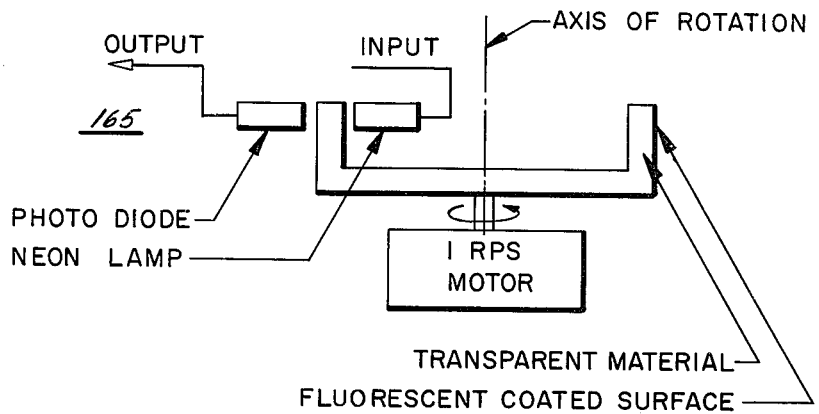
FIG. 9 is a diagram of a fluorescent memory used in the electronic alarm control of FIG. 7.

The purpose of the alarm control 132 (FIG. 7) is to evaluate the results of the transponding process and determine if $T_c$ is less than a critical time $\tau_c$. If $T_c$ is greater than $\tau_c$, a small rotating fluorescent memory 165 (FIG. 9), synchronized with the clock pulse $P_1$ stores the information that the interrogating signal occurring at a particular time during each one-second period may be temporarily ignored as a collision threat. The output of this memory is a voltage that increases at the time of such itnerrogating signals and thereby inhibits the action of the threat pulse discriminator 114. Planes flying nearby but on parallel courses will occasionally transpond but only often enough to reaffirm the safety of their respective courses.

Figure 8:
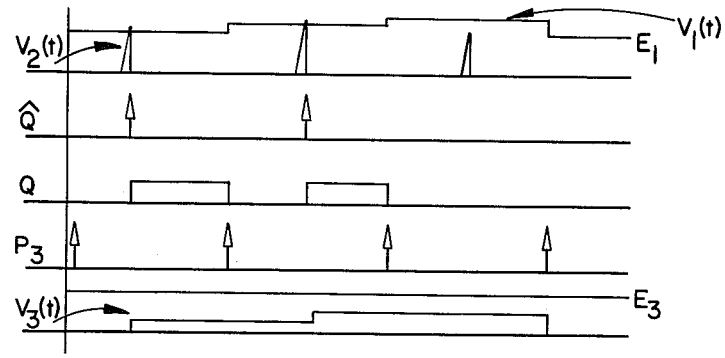
FIG. 8 is a diagram showing the waveforms of typical operation of the alarm control shown in FIG. 7.

An additional purpose of the alarm control 132 that is of paramount importance is the evaluation of repeated transponding intervals. A sequence of such intervals is shown in FIG. 8. The circuit is arranged so that the $\tau_c$ decreases by 1 second each second. If the computed value of $T_c$ does not keep pace with $\tau_c$, transponding is inhibited.

Figure 7:
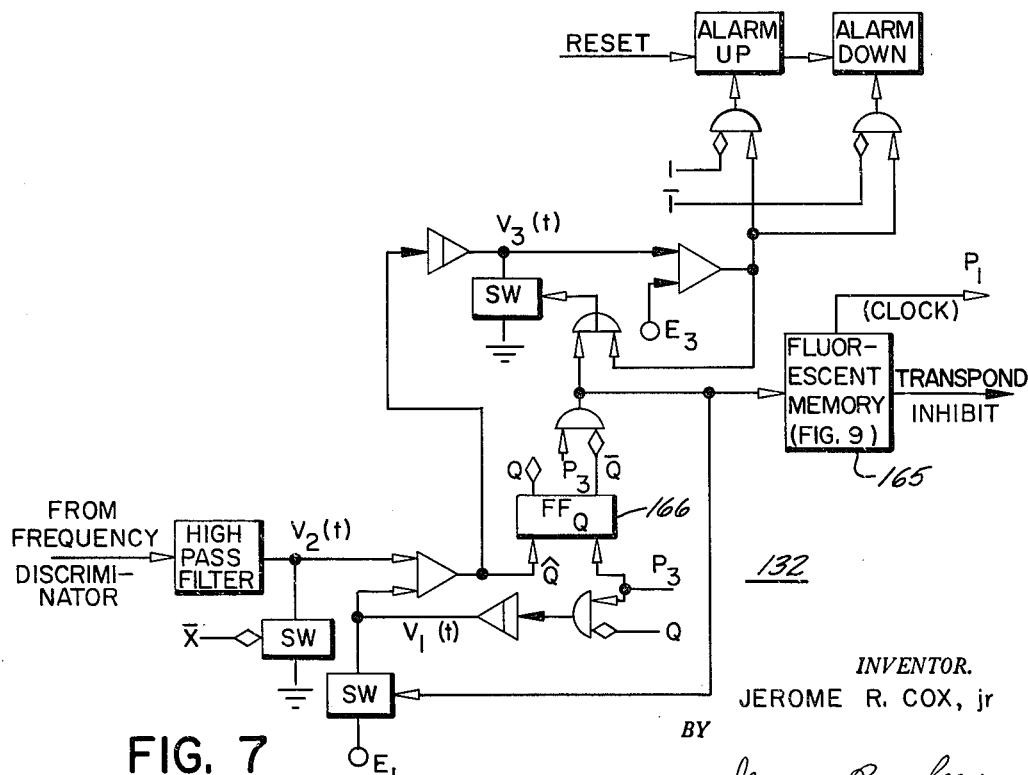
FIG. 7 is a view of a diagram of an electronic alarm control used in my collision avoidance system.

If, however, $T_c$ is found to decrease with real time over a series of transponding intervals, the pilot is warned and instructed to maneuver either up or down. The circuit for accomplishing these functions is also shown in FIG. 7. The same conventions are used as were described in connection with FIG. 1.

The voltage $V_1$ is inversely proportional to $\tau_c$. The voltage $V_2$ is inversely proportional to $T_c$. When $T_c$ is less than $T_{c0}$, the voltage $V_2$ exceeds $V_1$, $FF_Q$ 166 is set allowing pulse $P_3$ to produce an increment in the voltage $V_1$. This increment is adjusted so that it corresponds to a decrease in $\tau_c$ of 1 second. The pulse $P_3$ also resets $FF_Q$ 166 so that it is ready for the next transponding interval. Each time that $V_2$ exceeds $V_1$, an increment in $V_3$ is produced. If 5 or 10 successive increments are produced, a pulse will appear that will set either the "Alarm Up" or the "Alarm Down" signal, depending upon whether the plane under consideration initiated the transponding or not. The pilot executes the appropriate collision avoidance maneuver and acknowledges the alarm by resetting it so that the system can proceed to the evaluation of other threats.

Note that if at any time $V_1$ exceeds $V_2$, each of the integrating amplifiers is reset and the fluorescent memory 165 stores the information.

Also note that $E_1$ is a fixed reference voltage that is inversely proportional to the maximum time to collision that requires any consideration. Likewise, $E_3$ is a fixed reference voltage chosen so that the optimum number of successive transponding periods will cause the alarm to be set off. It is believed the optimum number will lie between 5 and 10. However, the system may be designed by readjustment of the voltage $E_3$ to set off the alarm system after any number of successive transponding periods each producing an increment in voltage $V_3$ as for example between 5 and 10 periods or even below 5 or above 10.

CONCLUSIONS

The system described above, though not extremely simple, is not nearly as complicated as many electronic systems already carried in aircraft. It utilizes no precision components, depending for its accuracy upon the mutual transponding process. By direct measurement of $T_c$, accuracy is much greater than other systems can achieve.

It is also important to note that the amount of information exchanged is minimized. In most situations, no transponding is required because the interrogating signals indicate no danger. Whenever transponding is initiated, and the results show that there is no immediate danger, future transponding is for a time inhibited. Only when the threat is fairly severe is repetitive transponding undertaken. It is therefore felt that the loading of the available radio spectrum is minimized in the system described. It is also important to note that the system continues to function even when more than one plane attempts to transpond with the potential threat. Because of the range AGC function, transponding will be maintained only with the plane closest to the threatening plane.

The system described above is, of course, the simplest of the various graded systems described previously in this specification. The design of the more complicated systems can proceed on a fairly straightforward basis, based on the design of the above system. The more sophisticated pieces of equipment would be able to initiate transponding at ranges greater than the simple system.

In summary, the proposed system is relatively simple, uses no precision or ultra-stable components, and yet performs the complete collision avoidance task with an accuracy that may be superior to any proposed system.

The operation may be summarized in brief. Each plane continuously sends out an interrogating pulse at intervals of approximately one second, these pulses being automatically spaced from pulses sent out by aircraft in the same vicinity at substantially uniform time spacing. When any such interrogating pulse is received by another aircraft and the pulse has an intensity or power above a given minimum, the pulse automatically actuates a transponding process through the transponding control. This continues for approximately 1 millisecond. During this transponding process the frequency shift is measured. If the frequency shift of $\Delta f$ is relatively large the time to collision $T_c$ is small because $$T_c = \frac{f_0 T}{\Delta f}$$

So a large frequency shift as measured by the Alarm Control operates the alarm to notify the pilot that a collision is imminent and to execute a collision avoidance maneuver.

It is to be understood that the above described embodiments of my invention are for the purpose of illustration only, and various changes may be made thereto without departing from the spirit and scope of the invention.

I claim:

1. In apparatus for the minimizing of aircraft collisions in midair comprising a plurality of electronic devices each mounted on a separate aircraft, each such electronic device including:
    a radio transmitter at times transmitting pulses with a prescribed carrier frequency;
    a radio receiver at times receiving pulses transmitted by the transmitter on the other aircraft;
    a trigger device controlled by said receiver and capable of causing the transmitted to transmit pulses immediately after the recognition of a pulse signal transmitted on substantially said prescribed frequency whereby the transmitter will transmit pulses more freqeuntly than it would without such excitation; and
    a device controlled by differences between the frequency of the pulse transmitted and the frequency of the pulse received for calculating the measure of the minimum time to collision between the aircraft.

2. The structure of claim 1 in which there is provided means comprising the receiver, trigger and transmitter on a receiving aircraft for causing a return pulse to be sent back to the initiating aircraft and in which there is provided means for measuring the time lapse between the transmission of a pulse by said initiating aircraft and the receipt of a return pulse by said initiating aircraft for measuring the range between said initiating aircraft and the responding aircraft.

3. The structure of claim 2 in which there is provided means dependent upon the measurement of the frequency shift between the frequency of the pulse transmitted and the frequency of the pulse received, for computing electronically the minimum time to collision.

4. The structure of claim 3 in which there is provided means for computing the minimum time to collision dependent upon the measured range and the measured frequency shift.

5. The structure of claim 4 in which there is also provided in combination, means for equal spacing of signals from a large number of aircraft maneuvering in a restricted space.

6. The structure of claim 1 in which there is provided means including the receiver, trigger and transmitter on a receiving aircraft for causing repeatedly a return pulse to be sent back to the initiating aircraft and means including the receiver, trigger and transmitter on the initiating aircraft for causing repeatedly a return pulse to be sent back to the receiving aircraft and in which means are provided for cumulating the frequency shift of the last transmitted signal from the original frequency based on the fact that the frequency of the retransmitted signal in each case is the same as the received signal and means are provided for measuring such cumulative frequency shift in order to measure the minimum time to collision in accordance with the equation:

$$\frac{\Delta fT}{f_0} = \frac{T}{T_c}$$

where $\Delta fT$ is the frequency shift, $f_0$ is the original frequency, $T$ is the time of transponding and $T_c$ is the minimum time to collision.

7. In apparatus for minimizing the danger of aircraft collision in midair comprising a pair of sets of electronic devices each set being mounted on a separate aircraft and each such set of electronic devices including:
    a means comprising a radio transmitter for transmitting pulses usually and initially upon a prescribed carrier frequency;
    means including a radio receiver for at times receiving pulses transmitted by the radio transmitter of the other aircraft;
    means including said first named transmitter and a trigger device excited by said receiver for transmitting radio pulses upon the carrier frequency of the pulses received immediately upon the receipt by said receiver of pulses from said other aircraft and more frequently than it would without such excitation; and
    means controlled by the difference between the frequency of the pulses transmitted and the frequency of the pulses received for indicating the measure of the minimum time to collision of said aircraft.

References Cited by the Examiner

UNITED STATES PATENTS

| 2,894,258 | 7/59 | Vantine et al. | 343—7.5 |
| 3,019,434 | 1/62 | Bushnell et al. | 343—7.5 |

FOREIGN PATENTS

| 1,121,949 | 5/56 | France. |

CHESTER L. JUSTUS, *Primary Examiner.*